Feb. 13, 1940.  A. M. ALEXANDER  2,190,226
METHOD OF INTRODUCING A FLAVORING INGREDIENT INTO A FROZEN COMESTIBLE
Filed June 11, 1937  2 Sheets-Sheet 1

INVENTOR
Armstead M. Alexander
BY
ATTORNEY

Feb. 13, 1940.  A. M. ALEXANDER  2,190,226
METHOD OF INTRODUCING A FLAVORING INGREDIENT INTO A FROZEN COMESTIBLE
Filed June 11, 1937  2 Sheets-Sheet 2

INVENTOR
Armstead M. Alexander.
BY
ATTORNEY

Patented Feb. 13, 1940

2,190,226

UNITED STATES PATENT OFFICE 2,190,226

METHOD OF INTRODUCING A FLAVORING INGREDIENT INTO A FROZEN COMESTIBLE

Armstead M. Alexander, Independence, Mo.

Application June 11, 1937, Serial No. 147,656

9 Claims. (Cl. 99—136)

This invention relates to a method of and apparatus for introducing a flavoring ingredient into a partially frozen comestible, such as ice-cream, and particularly the introduction of chocolate and similar materials capable of maintaining visual identity when dispersed in the cream.

The principal object of the invention is to introduce the flavoring particles so that they are carried by the frozen cream as a vehicle and out of contact with parts of the apparatus until they have assumed substantially the temperature of the vehicle before dispersing the particles uniformly throughout the body of cream with which they have been held in contact.

Other important objects of the invention are to effect introduction of flavoring such as chocolate, in melted form directly onto a continuously moving stream of partially frozen cream to effect solidification and shattering thereof into solid particles incidental to shock brought about by contact with the frozen cream; to maintain the chocolate or the like in sole contact with the frozen cream until the shattering has been completely effected and then to uniformly distribute the shattered particles throughout the body of the frozen cream so that they retain their original shape; to effect feed of chocolate and like material onto, and/or between continuously moving streams of ice-cream as they are discharged from continuous process freezers; and to effect dispersion of the shattered particles without destroying the original texture of the frozen cream.

In accomplishing these and other objects of the invention, as hereinafter pointed out, I have provided improved details in method and structure, as illustrated in the accompanying drawings, wherein.

Referring more in detail to the drawings:

I designates one form of apparatus for practicing my improved method of introducing chocolate, or similar material capable of maintaining its visual identity, into continuously moving streams of frozen comestibles, such as ice-cream. The apparatus includes a housing or vessel 2, having converging ducts 3 and 4 leading to a mixing chamber 5. The ducts 3 and 4 are connected with continuous process freezers (not shown), from which streams of cream 6 and 7 are discharged under pressure for flow therethrough for union and subsequent mixture in the chamber 5. The ducts 3 and 4 are preferably of rectangular cross-section so that the streams of frozen cream are carried into the mixing chamber 5 in substantially flat, ribbon-like formation.

Figure 1:
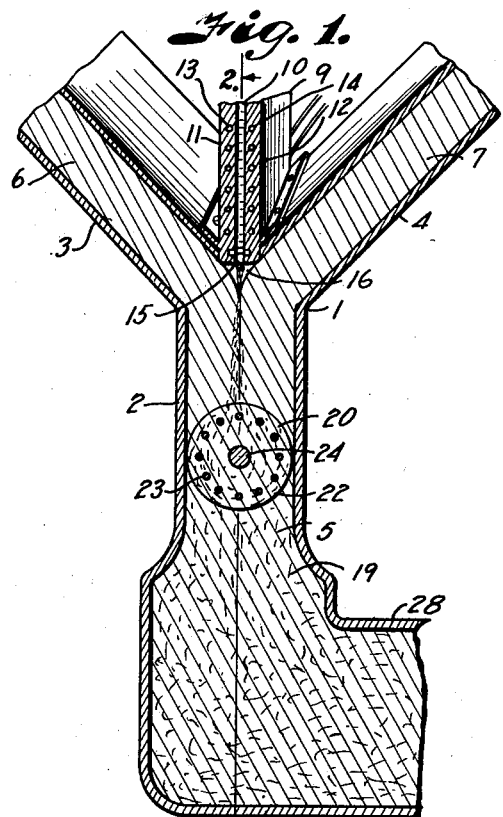
Fig. 1 is a vertical section through an apparatus particularly designed for introducing a flavoring ingredient, such as chocolate, between progressively moving streams of partially frozen comestibles, and for effecting mixture of solidified flavoring particles throughout the body thereof.

Located at the converging point of the ducts 3 and 4, and in substantially axial alignment with the chamber 5, is a duct 9 conforming in width to the ducts 3 and 4 and having a flow channel 10 through which melted chocolate or the like is discharged between the streams of cream 6 and 7. The walls 11 and 12 of the duct 9 are preferably provided with suitable heating elements, such as electrical resistance coils 13 and 14 to prevent congealing of the chocolate while it is being introduced through the duct 9. The duct 9 is preferably removably connected with the housing for cleaning purposes, and is insulated therefrom to retard conduction of heat to the cream ducts 6 and 7. Formed in the bottom of the duct 9, and extending across the width of the channel 10, is a series of ports 15 through which the chocolate is discharged under pressure in divided streams for flow through an expansion space 16 that is formed between the converging streams of cream, as clearly shown in Fig. 1.

Figure 2:
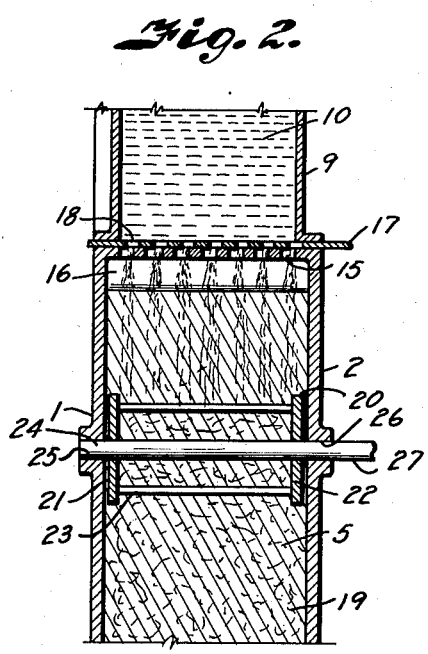
Fig. 2 is a cross-section on the line 2—2 of Fig. 1.

The volumetric flow of the respective streams of chocolate is controlled by a slide valve 17, having a series of ports 18 adapted to adjustably register with the ports 15 upon selective setting of the valve, as shown in Fig. 2, so that the flow of chocolate may be selectively proportioned to the volumetric flow of the cream. The streams of chocolate, upon contacting the streams of cream, are held in confinement thereby so that they are kept out of contact with the wall or other metal parts of the apparatus until they have become thoroughly congealed and have substantially assumed the temperature of the streams of frozen cream.

During congealing of the streams of chocolate, they are completely shattered incidental to the shock of contact with the cream so that the chocolate is broken into a multitude of substantially flat, flake-like particles as indicated at 19. These particles are carried between the united streams of cream progressively with movement thereof through the chamber 5, and are brought by the progressive movement of the cream into contact with a mixing device 20 that is located in the lower portion of the chamber 5.

The mixing device is shown as including spaced disks 21 and 22, connected by a circular series of rods 23 arranged about the axis of an actuating shaft 24 on which the disks are mounted, as best shown in Fig. 2. The shaft 24 has its ends journaled in suitable bearings 25 and 26 in the opposite walls of the chamber, and has a projecting end 27 adapted for connection with any suitable actuator (not shown), to effect rotation of the mixer. The rods 23 are moved through the united streams of cream, effecting mixture and dispersion of the formed particles throughout the body of the cream so that when it is discharged from the mixing chamber the chocolate particles are uniformly dispersed within the mass of the cream. The cream is then discharged from the housing 2, through a duct 28 leading to any suitable packing mechanism (not shown).

In carrying out the present invention, it is necessary that the melted chocolate be kept in liquid state until it is contacted with the streams of cream 6 and 7, to be carried thereby into the mixing device. The space 16 is, therefore, important as it prevents contact of the frozen cream with the chocolate inlet and facilitates entrance of the chocolate between the streams of frozen cream. It is also important that dispersion or distribution of the chocolate should not be effected until it has been congealed and completely shattered to form the individual particles and for this reason the mixing device is located substantially below the chocolate inlet.

Figure 3:
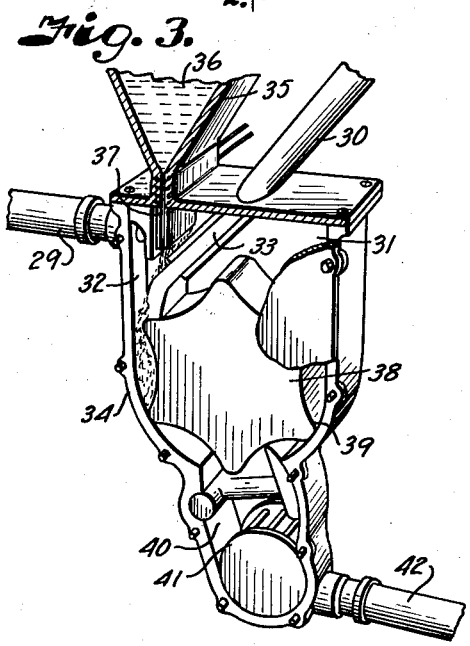
Fig. 3 is a perspective section of a modified form of apparatus.

In the form of the invention just described, the introduction of the chocolate and formation of the particles, including dispersion thereof, is carried out under pressure incidental to continuous movement of the streams of cream from the freezers, but in the form of the invention illustrated in Fig. 3, the streams of cream are discharged through ducts 29 and 30, opening respectively into the side and top of a vessel forming an expansion chamber 31 wherein the pressure is relieved. The ducts 29 and 30 are arranged in such angular relation to each other that the streams of cream 32 and 33 converge and move together in one united stream for flow down the side 34 of the vessel which carries the duct 29. Carried by the vessel, above the point of convergence of the streams of cream, is a hopper 35, carrying a body of melted chocolate or the like 36 which is discharged through a throat 37 in individual streams, substantially in the same manner as disclosed in the preferred form of the invention. In this form the streams of chocolate drop by gravity into contact with the converging streams of cream, and become congealed and shattered incidental to shock of the cold streams prior to mixture of the shattered particles. In this form of the invention, it is necessary to reestablish pressure of the united streams to effect their continuous movement out of the expansion chamber 31, and this is effected by a rotor 38 having blades 39 for engaging the cream and moving it into a mixing chamber 40, depending from the expansion chamber 31. The mixing chamber 40 includes a mixing device 41, similar to that described in the first form of the invention, to effect mixture of the shattered particles with the cream and to effect continuous discharge of the cream through a discharge duct 42.

Figure 4:
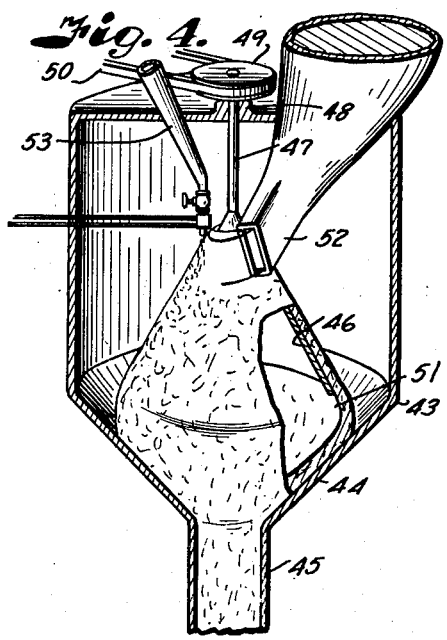
Fig. 4 is a sectional perspective through a further modified form of the invention.

In the form of the invention illustrated in Fig. 4, the vessel forms a mixing chamber 43 of substantially cylindrical shape and has a cone-shaped bottom 44 carrying an axial discharge duct 45. Rotatably mounted in the cylindrical chamber 43 is a substantially cone-shaped rotor 46 that is carried on a shaft 47, which is rotatably mounted in a suitable bearing 48 carried by the upper wall of the mixing chamber 43. The shaft is driven by a suitable pulley 49 operable by a belt 50, which is operated by any suitable actuator (not shown). The base of the cone rotor terminates short of the conical bottom 44 to provide an annular outlet 51 for the cream. In this form of the invention a stream of cream is introduced through a nozzle 52, discharging substantially tangentially with the apex of the cone rotor so that it flows downwardly over the sides of the cone and through the annular outlet 51. The chocolate is introduced through a duct 53 having a discharge nozzle located adjacent the apex of the cone rotor to discharge a stream of liquid chocolate onto the cream to be carried on the surface thereof while it is being moved toward the outlet 51. The chocolate, upon contacting the surface of the cream, becomes congealed and shattered as in the instances above described, and the mixture is effected by movement of the cream over the base of the cone rotor and through the outlet 51 where it is directed by the cone bottom to the discharge duct 45. This tortuous movement of the cream effects complete dispersion of the chocolate particles so that they are uniformly distributed throughout the body of cream when it is discharged through the duct 45.

Figure 5:
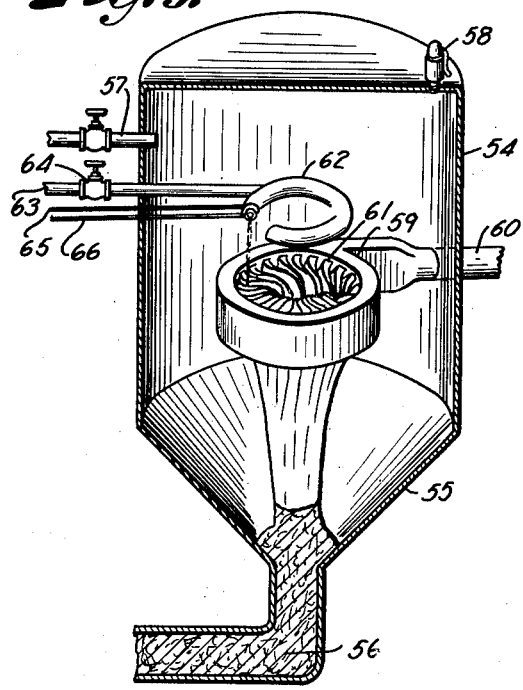
Fig. 5 illustrates a further modification of the invention.
Figure 6:
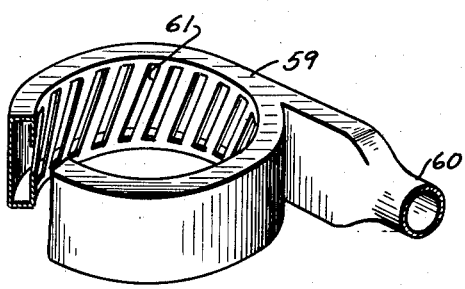
Fig. 6 is a detail perspective view, partly in section, of the frozen cream inlet nozzle employed in the form of the invention illustrated in Fig. 5.

The form of apparatus illustrated in Fig. 5 includes a cylindrical vessel 54, having a cone-like bottom 55 connected with a delivery duct 56. The container 54 is entirely closed and a pressure is maintained therein by introduction of a gaseous medium through a pipe 57 opening into the top of the container. The pressure is maintained constant by means of a regulating valve 58 which is set to maintain a sufficient pressure to force discharge of cream through the outlet duct 56 and to maintain space within the housing. The cream is admitted through a hollow, ring-like nozzle 59 that is positioned concentrically within the vessel and which is connected with a duct 60 having tangential discharge into the ring. The inner periphery of the ring is provided with a series of inclined ports 61 through which the cream is extruded in a plurality of ribbon-like streams. The chocolate is discharged under pressure through a ring type dropper 62, having perforations located above the ejected ribbons to distribute the chocolate thereon for effecting solidification and shattering of the solidified streams or drops incidental to shock as in the other forms of the invention. The chocolate is delivered to the nozzle through a pipe 63 under control of a valve 64. The ring 62 is preferably heated to maintain the chocolate in melted condition by suitable resistance elements supplied by the conductors 65 and 66.

Figure 7:
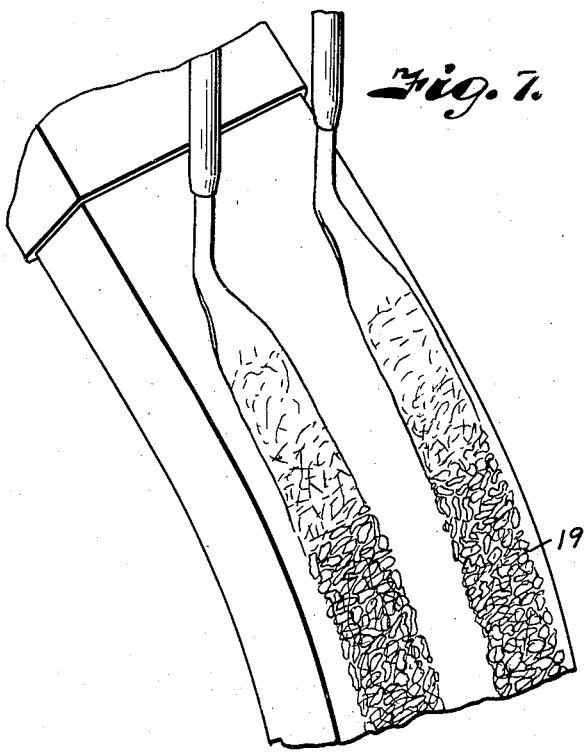
Fig. 7 is a diagrammatic view illustrating the principle of the present invention, wherein streams of melted chocolate are discharged onto a stream of moving cream to effect congealing and shattering thereof into individual particles.

Fig. 7 shows a diagrammatic view depicting solidification and shattering of the solidified streams of chocolate by contact with a stream of ice-cream.

Figure 8:
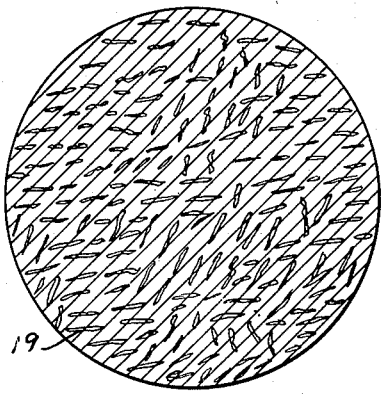
Fig. 8 is a diagrammatic section through a body of the cream showing dispersion of the particles.

Fig. 8 shows a section through a body of ice-cream, depicting the uniform distribution of the chocolate particles.

By mixing the particles of shattered chocolate with the cream continuously with its movement toward the packaging apparatus, I am enabled to assure uniform distribution with a minimum of cream agitation and substantially without attrition or breaking up of the chocolate particles.

Since the particles of chocolate are not materially reduced incidental to mixing there are no fine particles tending to discolor the cream or to cause rough texture. The ultimate product, in the case of vanilla and similar creams, retains its clear color and texture. The cream is also free of lumps and large particles of chocolate that may be disagreeable to the taste. The chocolate particles are all of thin, flaky character, and are readily melted upon melting of the cream when consumed.

From the foregoing it is apparent that I have provided an improved apparatus and process for introducing flavoring ingredients into frozen cream, particularly those of chocolate and similar materials which are capable of maintaining their identity when dispersed in the frozen cream.

It is also obvious that by introduction of the chocolate in relatively small streams, and maintaining the chocolate in contact with the cream until it has been shattered, no large lumps of chocolate are formed which must later be reduced incidental to mixing of the particles with the cream. The chocolate particles thus substantially retain their original identity and shape which they assume incidental to shattering when contacted with the frozen streams of cream.

What I claim and desire to secure by Letters Patent is:

1. The method of introducing a flavoring ingredient into a partially frozen comestible including, forming the comestible into separately moving streams to maintain space therebetween, maintaining the streams under gaseous pressure at the place of separation, effecting convergence of said streams, introducing the flavoring ingredients through said space and between said streams substantially at the time and place of said convergence and while under said gaseous pressure, and dispersing the flavoring ingredient in individual particles throughout the body of the frozen comestible after convergence of said streams.

2. The method of introducing chocolate into ice-cream in plastic state, including discharging the ice-cream from the place of freezing in a continuous stream, melting the chocolate, flowing the melted chocolate onto the stream of ice-cream to effect shattering of said chocolate into individual particles, carrying said chocolate on the stream until the shattering is substantially complete, and mixing the particles uniformly in the body of said stream.

3. The method of introducing chocolate into a frozen ice-cream, including discharging the frozen ice-cream under pressure from the place of freezing in separate ribbon-like streams to maintain a space therebetween, bringing said streams into convergence to effect union of said streams, melting the chocolate, flowing the melted chocolate through said space between said streams at the place of union, carrying said chocolate between said streams until the chocolate has congealed, and mixing the chocolate with said united streams.

4. The method of introducing a flavoring ingredient into a partially frozen comestible including, moving the comestible under pressure into a zone for introducing the flavoring ingredient, introducing a gaseous pressure into said zone to retard set of the comestible and maintain a gas-filled space in said zone, introducing the flavoring ingredient into said zone and in contact with the frozen comestible, and effecting mixture of said ingredient into the comestible while the comestible is maintained plastic by said pressure.

5. The method of introducing chocolate into ice-cream while in plastic state including moving the ice-cream in a continuous stream from the place of freezing in separate ribbon-like streams to a zone for introducing the chocolate, bringing the streams together to effect union of said streams at said zone, maintaining a gas filled space in said zone at the union of said streams, melting the chocolate, discharging the melted chocolate into the space, and carrying the chocolate between said streams until the chocolate has congealed.

6. The method of introducing a flavoring ingredient into a frozen comestible including, forming the comestible into separately moving streams, maintaining said streams under pressure to sustain plasticity of said comestible, effecting union of said streams, introducing a gas under pressure to maintain a gas filled space ahead of the union point of said streams, introducing a flavoring ingredient into said gas filled space for entrance between said streams substantially at the time and place of said union, and dispersing said flavoring ingredient uniformly in the body of said united streams.

7. The method of introducing a congealable flavoring ingredient into a frozen comestible including, forming the comestible into separately moving streams, maintaining said streams under pressure to sustain plasticity of said comestible, effecting union of said streams, introducing a gas under pressure to maintain a gas filled space ahead of the union point of said streams, melting the flavoring ingredient, flowing the melted flavoring ingredient through said space for entrance between said streams for congealing and shattering thereof incidental to chilling contact of said streams, carrying said flavoring ingredient between said streams until the shattering is substantially complete, and effecting mixture of the shattered particles of said flavoring ingredient and with the stream of comestible.

8. The method of introducing chocolate into ice-cream including, discharging the ice-cream under pressure from the place of freezing in a ribbon-like stream into a gas filled space while maintaining said pressure, melting the chocolate, and flowing the melted chocolate through said space onto said stream to effect congealing and shattering of the chocolate incidental to the chilling of the chocolate by said stream.

9. The method of introducing chocolate into ice-cream including, discharging the ice-cream under pressure from the place of freezing in separate ribbon-like streams, bringing said streams while under pressure into convergence within a gas filled space, melting the chocolate, and flowing the melted chocolate through said space and between said streams to effect congealing and shattering of the chocolate incidental to the chilling of the chocolate by said streams.

ARMSTEAD M. ALEXANDER.